United States Patent Office 2,901,419
Patented Aug. 25, 1959

2,901,419

CATALYTIC CONVERSION WITH THE ADDITION OF A METAL OR METALLIC COMPOUND

Rudolf F. Brill, Princeton, N.J., assignor to Phillips Petroleum Company, a corporation of Delaware No Drawing. Application February 18, 1954
Serial No. 411,269

28 Claims. (Cl. 208—119)

This invention relates to a method for effecting catalytic conversion. In one aspect this invention relates to a method for effecting conversion of hydrocarbons. In another aspect this invention relates to a method for preventing undesirable catalytic effects in a catalytic conversion, resulting from accumulation of metal or metal-containing impurities on the catalyst surface, by admixing with the said catalyst a metal and/or a metal compound of such metal, of the class defined hereinafter. In another aspect this invention relates to a method for reducing detrimental effects on product yield, in a catalytic cracking process, which result from the accumulation of metal contaminants on the catalyst surface during cracking, by introducing together with catalyst into the catalyst zone, at least one metal or compound of such metal of a class defined hereinafter. In still another aspect this invention relates to an improved fluid catalytic cracking process in which the detrimental effect of the accumulation of heavy metal contaminants on the cracking catalyst is substantially reduced by admixing a small quantity of a finely divided metal and/or a compound of such metal with the circulating catalyst.

In various catalytic conversion processes, impurities or contaminants are formed an accumulate on the catalyst surface causing deactivation of same, to produce product in concomitantly lowered yield and/or to produce undesired products at the expense of those formed under conditions of normal catalyst activity. Many such impurities or contaminants are combustible under normal combustion regeneration conditions but others, particularly heavy metal or metal-containing contaminants, are not so removed by combustion regeneration and, as a result of their accumulation on the catalyst surface cause formation of undesired product at the expense of desired product. Thus, in the catalytic conversion of hydrocarbons, when heavy metal contaminants have accumulated on the catalyst surface, a relatively large quantity of the hydrocarbon charge is caused to be converted to carbonaceous materials and fixed gases, the latter generally predominantly hydrogen.

Thus, in any such process in which metallic contaminants are accumulated on the catalyst to produce relatively high yields of undesirable products at the expense of desired products, the selectivity of the catalyst has been decreased. Accordingly, it is important that a method be provided whereby the normal selectivity of the catalyst be maintained, i.e., whereby in the presence of the said contaminants the time during which the desired type products are formed without concomitant formation of unduly large amounts of undesirable products is materially increased.

In one form of the conversion of hydrocarbons by catalytic cracking, hydrocarbon feed is cracked in a reactor in the presence of a catalyst, deactivated catalyst is withdrawn, regenerated in a regenerator, and regenerated catalyst is returned to the reactor for reuse. In the regenerator, the carbonaceous materials deposited on the catalyst during cracking are burned off in the presence of a controlled amount of air. The combustion regeneration procedure does not, however, remove the metallic contaminants, which accumulate on the catalyst surface. These contaminants may be derived from the hydrocarbon feed material, but it is also possible that they are eroded from the metallic equipment. The principal metallic contaminants are believed to be compounds of iron, nickel, vanadium, and other heavy metals, generally in the free state or as an oxide. An analysis of one such used hydrocarbon cracking catalyst showed 1.1 weight percent iron, 0.01 weight percent of vanadium, and 0.02 weight percent nickel. Such a typical contaminated catalyst may often contain up to about 0.5 weight percent vanadium and 0.05 weight percent, and higher, of nickel. However, specific composition of used catalyst is dependent on the particular catalyst and condition under which it is employed.

The presence of these metal or metal-containing contaminants on the hydrocarbon cracking catalyst surface causes an undesirable effect on the conversion of heavier hydrocarbons to lighter hydrocarbons. Instead of useful hydrocarbons being formed, a substantial quantity of the feed hydrocarbon is converted to fixed gases and undesirable carbonaceous materials, so that the ultimate yield of desirable hydrocarbon products and the heating value of the effluent gas from the cracking zone are reduced. The normal selectivity, i.e., selectivity characteristic of that catalyst when not contaminated with the contaminants, and in some cases, activity of the catalyst is reduced by the presence of these contaminants, i.e., their accumulation on the catalyst surface, and as a result, a substantial quantity of the catalyst must be discarded and replaced with fresh catalyst in order to maintain a satisfactory catalyst selectivity for optimum operation of the process.

In accordance with this invention, in a process wherein a metal or metal-containing contaminant is deposited on a catalyst surface with a concomitant reduction in the normal selectivity of the catalyst, the improvement is provided, comprising introducing together with the said catalyst into the catalyst zone, at least one material selected from the group consisting of metals of the right-hand subgroups of groups I and II of the periodic system and compounds of said metals, whereby the reduction in normal selectivity of the said catalyst, concomitant with presence of the said contaminants, is decreased, i.e., substantially prevented, and the said normal selectivity is maintained. Preferably, the said material introduced with catalyst into the catalyst zone is one selected from the group consisting of metals selected from the group consisting of copper, silver, gold, zinc, cadmium, and mercury, and compounds of said metals. The periodic system referred to herein is that of Mendeleeff's arrangement, set forth for example in Handbook of Chemistry and Physics, thirty-fourth edition, 1952, at pages 342–343.

Alternatively to the use of metals, and compounds of metals, of groups I and II of the periodic system as described in accordance with this invention, I have found that metals, and compounds of metals, of groups III and IV of the periodic system (Mendeleeff's), preferably those of the right-hand sub-groups, can be similarly employed. That is to say, the latter materials (metals of groups III and IV, and compounds thereof) can, in a process, for example a hydrocarbon cracking process, wherein a metal contaminant is deposited on a catalyst surface with concomitant reduction in the selectivity of said catalyst, be introduced together with said catalyst into the catalyst zone whereby the said concomitant reduction of catalyst selectivity is substantially decreased, i.e., markedly lessened or substantially prevented. Of the metals of groups III and IV and compounds thereof employed in the practice of this invention, tin and tin compounds are now preferred.

As applied to the catalytic cracking of hydrocarbons, my invention provides for reducing the hydrogen- and carbon-producing characteristics of the catalyst and for improving catalyst life, i.e., for increasing the effective life span. The detrimental effect of metal contaminants accumulated on the hydrocarbon cracking catalyst is reduced by the presence of a metal and/or a compound of said metal in the catalyst zone, in accordance with this invention, the said metal and/or compound thereof having been admixed with catalyst in any desired manner. For example, in a circulating fluid-catalytic cracking operation, finely divided metallic zinc, or finely divided zinc fluoride can be admixed with circulating catalyst at any desired point in the system, such as by way of the feed line to the reactor or the catalyst return line to the reactor, preferably the catalyst line to the regenerator.

Further illustrative of suitable metal-containing compounds, applicable in the practice of my invention, are metal organic compounds, organic or inorganic complex salts, salts (e.g. halides, nitrates, oxalates, formates, etc.), oxides, and nitrides. The presently preferred class of metal compounds are those which are converted to the metals under the conditions of the process, for example, nitrates, metal alkyls, oxides, and oxalates, although halides are advantageously employed. Specific compounds include zinc oxalate, zinc oxide, zinc formate, zinc diethyl, cadmium fluoride, cadmium formate, cadmium oxalate, cadmium oxide, silver chloride, silver fluoride, silver nitrate, supric chloride, cupric nitrate, cupric oxide, mercuric oxalate, mercuric fluoride, mercuric chloride and mercuric formate.

The metal and/or metal compounds to be admixed with catalyst, in accordance with my invention, can be introduced into the system by injection either as a dry powder or as a slurry or suspension in a liquid hydrocarbon stream or a carrier gas stream. The amount of such compound added can vary over a wide range, depending on the type of catalyst employed and the constituents present in the hydrocarbon feed stream. Generally, a detectable amount of such added material is effective in reducing the detrimental effect of the metal contaminants on the hydrocarbon cracking catalyst surface, as for example, an amount equal to about 0.001 weight percent or less. Often a concentration of about 0.01 is employed up to about 0.3 weight percent of the catalyst. However, a larger amount of the metal and/or metal compound may be advantageously employed dependent upon specific conditions, in some cases an amount up to 0.5 weight percent of the catalyst, and higher, being employed.

Although I have disclosed various methods by which metal and/or metal compound additives can be introduced into the catalyst zone, it is to be understood that when desired, catalyst can be admixed with the said metal and/or metal compound and the resulting admixture charged to the catalyst zone. It is, of course, important in such operation, to periodically or continuously, as desired, introduce make-up amounts of metal and/or metal compound to maintain the desired concentration of same in the catalyst zone, to effect desired control of type product formed.

I am not certain as to the mechanism by which the addition of defined metal and/or metal compounds to a catalyst previously employed in a hydrocarbon cracking reaction and having metal contaminants on its surface, in accordance with this invention, achieves prevention of the concomitant reduction of catalyst selectivity. However, although my invention is advantageously applied to the treatment of such a hydrocarbon cracking catalyst, it may be applicable to the treatment of catalysts on the surface of which metal contaminants have been deposited during a conversion other than hydrocarbon cracking, with concomitant loss in effective life span of that catalyst. Exemplary of such conversion processes, i.e., other than hydrocarbon cracking, are isomerization, polymerization, and alkylation of hydrocarbons. However, the process of this invention as applied to the treatment of hydrocarbon cracking catalysts, is not equivalent to the removal of metal contaminants from the surface of catalysts which have not been employed as hydrocarbon cracking catalysts, i.e., the latter catalysts having been employed in conversion other than hydrocarbon cracking.

Included among various well-known hydrocarbon cracking catalysts to which my invention is advantageously applied, are siliceous materials such as blends or compounds of silica and alumina, silica and zirconia, and the like, of natural or synthetic origin, with or without the inclusion of other active components such as metals or metallic compounds, and which may or may not have been pretreated, for example, with an acid. Acid-treated montmorillonite (Filtrol 58 or Filtrol D) is further illustrative of such cracking catalysts.

My invention as applied to hydrocarbon cracking catalysts employed in cracking of any hydrocarbon cracking feed, exemplary of which are topped crude, virgin gas oil, cycle oil, hydrocarbon residuum, and the like.

It is to be understood that this invention is not limited to treatment of any specific cracking catalyst or class of such catalysts, nor to any specific feed stock or cracking conditions with which such a catalyst has been associated.

Metallic contaminants accumulate at appreciable rates, on the cracking catalyst surface, at temperatures throughout the cracking temperature range which is generally from about 700–1200° F., or higher, although such accumulation of metallic contaminants on the catalyst surface can occur outside such range.

In one embodiment of my invention as applied to catalytic cracking of hydrocarbons, cracking is effected in the catalyst zone, followed by removal of at least partially spent catalyst to a combustion regeneration zone to burn off combustible materials. Catalyst in the regeneration zone, contaminated with metals or metal compounds promoting formation of carbon and hydrogen in the conversion zone, is not freed of the latter during regeneration, thereby retaining the metallic contaminants on its surface. The detrimental effect of these metal contaminants on the cracking catalyst is substantially reduced by introducing into the catalytic conversion zone together with the catalyst from regeneration an appreciable, or detectable, amount of a metal and/or metal compound of the type defined above, i.e., the latter in sufficient amount to cause reduction of formation of hydrogen and carbon during conversion up to larger amounts, such as 0.5 weight percent of the catalyst or higher. The metal and/or metal compound so introduced into the conversion zone is advantageously in a finely divided form and is admixed with the circulating catalyst in any manner as desired, as already discussed, preferably in the catalyst line to the regenerator.

In the following examples are shown data obtained by testing different portions of "treated" and "untreated" catalyst, i.e., the treated catalyst having been admixed with zinc or zinc fluoride, and the treated catalyst being the same as the untreated catalyst except that the latter has not been admixed with zinc or zinc fluoride. In each of the following examples a gas oil was cracked in the presence of a used fluid cracking catalyst, i.e., an acid-activated bentonite (Filtrol D), one portion in each example having been treated in a manner as above described and another portion being untreated.

*Example I*

A used fluid cracking catalyst of acid activated bentonite (Filtrol D) was admixed with powdered zinc and heated in a muffle furnace at 1000° F. for two hours.

After cooling, the catalyst-zinc mixture was placed in a laboratory cracking unit in which the characteristics of the catalyst in the cracking of a conventional hydrocarbon feed stock were determined. An untreated and treated catalyst were each used to convert a standard gas oil under a fixed set of operating conditions. The data obtained in each run were then, for comparison, extrapolated to the same conversion level, namely 42.5 percent. The resulting data are summarized as follows:

|  | Conversion, percent | Carbon, Wt. percent of feed | Hydrogen, Cu. ft./bbl. feed |
|---|---|---|---|
| Untreated Catalyst: |  |  |  |
| Experimental data | 41.3 | 2.31 | 146.0 |
| Extrapolated to const. conv. | 42.5 | 2.44 | 155 |
| Treated Catalyst [1]: |  |  |  |
| Experimental data | 43.9 | 2.44 | 143.1 |
| Extrapolated to const. conv. | 42.5 | 2.27 | 133 |

[1] 0.3 gram of zinc admixed with 700 grams of used catalyst.

*Example II*

A used fluid cracking catalyst of acid-activated bentonite (Filtrol D) was admixed with powdered zinc fluoride and heated in a muffle furnace at 1000° F., for two hours. After cooling, the catalyst-zinc fluoride mixture was placed in a laboratory cracking unit in which the characteristics of the catalyst for cracking the conventional hydrocarbon feed stock of Example I were determined as described in Example I. An untreated catalyst and the treated catalyst were each used to convert a standard gas oil under a fixed set of operating conditions. The data obtained in each run were then, for comparison, extrapolated to the same conversion level, namely 45.0 percent. The resulting data are summarized as follows:

|  | Conversion, percent | Carbon, Wt. percent of feed | Hydrogen, Cu. ft./bbl. feed |
|---|---|---|---|
| Untreated Catalyst: |  |  |  |
| Experimental data | 44.0 | 2.33 | 147.2 |
| Extrapolated to const. conv. | 45.0 | 2.44 | 155 |
| Treated Catalyst [1]: |  |  |  |
| Experimental data | 46.5 | 2.44 | 142.6 |
| Extrapolated to const. conv. | 45.0 | 2.25 | 130 |

[1] One gram of zinc fluoride was admixed with 700 grams of the used catalyst.

The test conditions employed in measuring the data set forth in the foregoing examples are summarized as follows:

Feed stock _____ Gas oil
Boiling range _____ 500–900
Temperature, ° F _____ 980
Pressure, p.s.i.g _____ 10
Space velocity, grams oil per gram catalyst per hour _____ 3.4

In each of the foregoing examples the untreated catalyst and the treated catalysts each contained metal contaminants accumulated thereon during the use of said catalyst as a single mass in a preceding catalytic cracking reaction. That is to say, in each set of tests (Example I and Example II) all portions of untreated and treated catalyst were taken from a single body of catalyst previously used as described. The conditions of catalytic cracking, employing the body of catalyst from which the portions of treated and untreated catalyst set forth in the foregoing examples were derived, are summarized as follows:

Feed stock _____ Gas oil
Boiling range _____ 500–1100
Temperature, ° F _____ 900
Pressure, p.s.i.g _____ 10
Space velocity (LHSV) _____ 10

The catalyst body had a weight percent metal content of iron, vanadium and nickel, very nearly the same as that reported hereinabove, namely about 1.1, 0.01 and 0.02 respectively.

Reasonable variation and modification are possible within the scope of the foregoing disclosure and appended claims to the invention, the essence of which is that in a catalytic process wherein a metal or metal compound contaminant is deposited on a catalyst surface with a concomitant reduction in selectivity of the said catalyst, the improvement is provided which comprises introducing together with said catalyst, into the catalyst zone, at least one material selected from the group consisting of metals of the right-hand sub-groups of groups I and II of the periodic system and compounds of said metals, whereby said concomitant reduction of catalyst selectivity is substantially decreased, i.e., markedly lessened or substantially prevented.

I claim:

1. In a catalytic conversion process wherein a hydrocarbon feed containing a metal contaminant selected from the group consisting of iron, vanadium and nickel is converted in the presence of a catalyst and at least one of said group of metal contaminants is deposited on the surface of said catalyst during said conversion with a concomitant reduction in the selectivity of said catalyst, the improvement comprising introducing together with said catalyst into the catalyst zone, as a non-catalyst component, at least a material selected from the group consisting of copper, silver, gold, zinc, cadmium and mercury and compounds of said metals, in an amount so as to concomitantly decrease said reduction in catalyst selectivity.

2. The process of claim 1 wherein said catalyst is an acid-activated bentonite and said material is metallic zinc and said conversion process is catalytic cracking of said hydrocarbon.

3. The process of claim 1 wherein said catalyst is an acid-activated bentonite and said material is zinc fluoride and said conversion process is catalytic cracking of said hydrocarbon.

4. In the catalytic cracking of hydrocarbons wherein a hydrocarbon feed containing a metal contaminant selected from the group consisting of iron, vanadium, and nickel is catalytically cracked in the presence of a catalyst, and wherein at least one of said group of metal contaminants is deposited on the surface of said cracking catalyst during said conversion, with concomitant reduction in the selectivity of the said catalyst, the improvement comprising introducing together with said catalyst into the catalyst zone, as a non-catalyst component, at least a detectable quantity of at least one material selected from the group consisting of copper, silver, gold, zinc, cadmium, and mercury and compounds of said metals, in an amount so as to concomitantly decrease said reduction in catalyst selectivity.

5. In the catalytic cracking of hydrocarbons wherein the hydrocarbon feed contains a metallic contaminant which is deposited on the surface of cracking catalyst during said conversion and causes said catalyst to promote formation of fixed gases and carbon under conditions of said cracking thereby reducing the selectivity of said cracking catalyst, the improvement comprising introducing together with said catalyst into the catalytic cracking zone, as a non-catalyst component, at least one material selected from the group consisting of a metal selected from the group consisting of copper, silver, gold, zinc, cadmium and mercury, and compounds of said metals, whereby said concomitant reduction of catalyst selectivity is substantially decreased, the amount of said materials so introduced into the catalytic cracking zone being at least a detectable amount not exceeding 0.5 percent of the weight of said catalyst.

6. The process of claim 5 wherein said material is finely divided zinc fluoride.

7. The process of claim 1 wherein said metal is copper.
8. The process of claim 1 wherein said metal is silver.
9. The process of claim 1 wherein said metal is gold.
10. The process of claim 1 wherein said metal is zinc.
11. The process of claim 1 wherein said metal is cadmium.
12. The process of claim 1 wherein said metal is mercury.
13. The process of claim 5 wherein said cracking catalyst is removed from the cracking zone, regenerated by combustion regeneration, and then reintroduced into said cracking zone together with said material to suppress hydrogen and carbon formation.
14. The process of claim 5 wherein said metal material is introduced into said catalyst zone as a dry powder.
15. The process of claim 13 wherein said metal material is first admixed with said catalyst to be regenerated.
16. In a catalytic cracking of a hydrocarbon feed process wherein a metal contaminant selected from the group consisting of iron, vanadium and nickel is deposited on a catalyst surface from said hydrocarbon feed with a concomitant reduction in the selectivity of said catalyst, the improvement comprising introducing together with said catalyst, into the catalyst zone, as a non-catalyst component, a material selected from the group consisting of metals of the right-hand sub-groups of groups III and IV and of the periodic system, and copper, silver, gold, zinc, cadmium and mercury, and compounds of the said metals, in an amount so as to concomitantly decrease said reduction in catalyst selectivity.
17. The process of claim 16 wherein said material is metallic tin.
18. In the catalytic cracking of hydrocarbons wherein a hydrocarbon feed containing a metallic contaminant selected from the group consisting of iron, vanadium and nickel is catalytically cracked in the presence of a catalyst, and wherein at least one of said group of metallic contaminants is deposited on the surface of cracking catalyst and during said conversion, thereby causing said catalyst to promote formation of fixed gases and carbon under conditions of said cracking thereby reducing the selectivity of said catalyst, the improvement comprising introducing finely divided zinc as a non-catalyst component together with said catalyst into the catalytic cracking zone in an amount so as to concomitantly decrease said reduction of catalyst selectivity.
19. The process of claim 18 wherein the amount of finely divided zinc is at least a detectable amount and does not exceed 0.5 percent of the weight of said catalyst.
20. The process of claim 1 wherein the amount of said material added together with catalyst into said catalyst zone is at least a detectable amount and does not exceed 0.5 percent of the weight of said catalyst.
21. The process of claim 16 wherein the amount of said material added together with said catalyst into said catalyst zone is at least a detectable amount and does not exceed 0.5 percent of the weight of said catalyst.
22. The process of claim 13 wherein said material is introduced into said cracking zone as suspension in a hydrocarbon stream charged to said cracking zone.
23. The process of claim 5 wherein said material is introduced into said cracking zone as a slurry.
24. The process of claim 5 wherein said cracking catalyst is an acid-activated bentonite and said material introduced into said cracking zone is finely divided zinc.
25. The process of claim 5 wherein said cracking catalyst is an acid-activated bentonite and said material introduced into said cracking zone is finely divided zinc fluoride.
26. A process of claim 1 wherein said material is introduced into the said catalyst zone separately from the said catalyst.
27. A process of claim 4 wherein said material is introduced into said catalyst zone separately from said catalyst.
28. In a catalytic conversion process in which there is employed a used catalyst which has been contaminated with a metal selected from the group consisting of iron, vanadium and nickel by deposition on said catalyst from the feed employed in using the catalyst in a previous catalytic conversion step, thereby tending to reduce the selectivity of said catalyst, the step of adding a metal selected from the group consisting of copper, silver, gold, zinc, cadmium and mercury, and compounds of these metals, together with said used catalyst and with further portions of said feed to a subsequent catalytic conversion step, and thereby at least partially avoiding the reduction of said selectivity caused by said metallic contaminant contained in said feed.

References Cited in the file of this patent
UNITED STATES PATENTS

| | | |
|---|---|---|
| 2,139,602 | Raney | Dec. 6, 1938 |
| 2,389,780 | Ipatieff et al. | Nov. 27, 1945 |
| 2,418,889 | Kearby | Apr. 15, 1947 |
| 2,500,197 | Michael et al. | Mar. 14, 1950 |
| 2,636,845 | Richardson | Apr. 28, 1953 |
| 2,638,453 | Starr et al. | May 12, 1953 |
| 2,662,861 | Riblett et al. | Dec. 15, 1953 |
| 2,706,705 | Oettinger et al. | Apr. 19, 1955 |
| 2,769,770 | Bicek | Nov. 6, 1956 |

OTHER REFERENCES

"Catalyst Poisons and What To Do About Them," Petroleum Refiner, vol. 32, No. 2, February 1953, pages 125 to 127.

UNITED STATES PATENT OFFICE

CERTIFICATE OF CORRECTION

Patent No. 2,901,419                                                  August 25, 1959

Rudolf F. Brill

It is hereby certified that error appears in the printed specification of the above numbered patent requiring correction and that the said Letters Patent should read as corrected below.

Column 6, line 29, for "a material" read -- one material --; line 72, for "amount not" read -- amount and not --; column 7, line 27, strike out "and", first occurrence.

Signed and sealed this 21st day of June 1960.

(SEAL)
Attest:

KARL H. AXLINE
Attesting Officer

ROBERT C. WATSON
Commissioner of Patents